(No Model.)

C. B. TRAVER.
MILK REFRIGERATOR.

No. 395,464. Patented Jan. 1, 1889.

Attest:
Geo. H. Lott
W. E. Bowen

Inventor:
C. Bradley Traver,
By J. E. M. Bowen
Atty.

UNITED STATES PATENT OFFICE.

C. BRADLEY TRAVER, OF BROOKLYN, NEW YORK.

MILK-REFRIGERATOR.

SPECIFICATION forming part of Letters Patent No. 395,464, dated January 1, 1889.

Application filed October 1, 1887. Serial No. 251,258. (No model.)

*To all whom it may concern:*

Be it known that I, C. BRADLEY TRAVER, a citizen of the United States, and a resident of Brooklyn, in the county of Kings and State of New York, have invented certain new and useful Improvements in Milk-Refrigerators, of which the following is a specification.

My invention relates to refrigerators, and is particularly designed for keeping milk at a cold and even temperature during transportation from the dairy to the consumer and afterward until used. It is a well-known fact that milk which is subjected to variations of temperature before and after it reaches the hands of the consumer will sour much quicker than if it be maintained at a cold and even temperature. Indeed fresh milk that is kept in a proper refrigerating-receptacle will retain its purity for almost an indefinite period. By the employment of my invention families may be supplied in a cleanly and convenient manner with milk that will keep sweet and wholesome until consumed.

While the invention is primarily intended for the preservation of milk, it is obvious that the refrigerator may be used for cooling and maintaining in a cold condition other substances, liquids as well as solids.

The invention consists in the structure hereinafter described, and illustrated in the accompanying drawings, which form a part of this specification, and in which like features are indicated by like figures of reference in both views.

The points of novelty for which protection is desired are pointed out in the claims at the end hereof.

Figure 1:
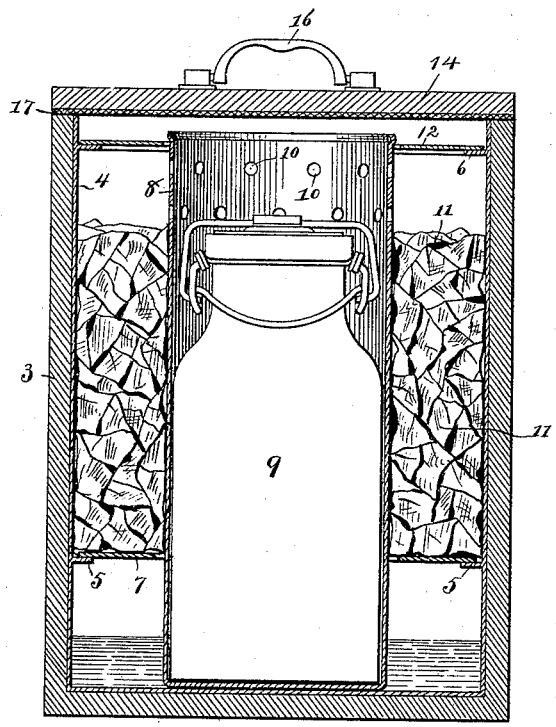
Figure 2:
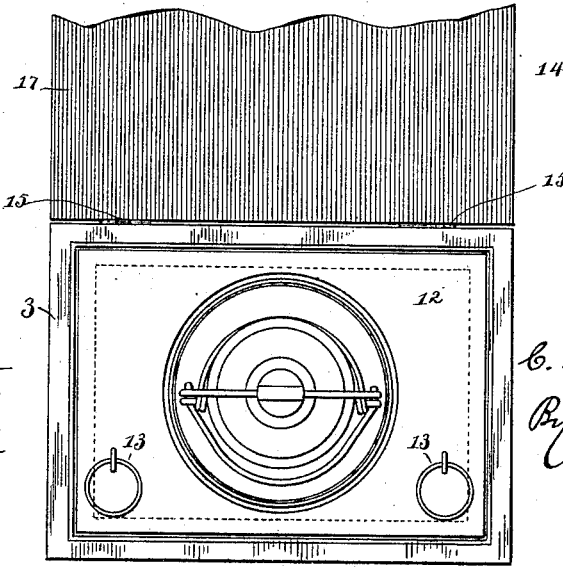

In the drawings, Figure 1 is a central vertical sectional view of a structure embodying my invention, and Fig. 2 is a top plan view of the same with the top of the structure open or thrown back.

Referring to the drawings, the figure 3 indicates a box or case, preferably of wood, and which may be of any convenient size, the intention being to make the same of various sizes, so that they may accommodate bottles of varying capacity. This box is lined with zinc, (indicated by 4,) which lining is provided with ledges 5 and 6, the former designed to receive and support a false bottom, 7, whereby a space at the bottom of the case is provided for drippings from the ice. The false bottom 7 is formed with a central opening to receive the interior receptacle, 8, which is designed to accommodate the milk-bottle 9, as shown. The receptacle 8 rests upon the bottom of the case 3 and extends upward to within a short distance of the upper edge of said case. Its size will of course depend upon the holding capacity of the bottle which it is to contain. Near the top of receptacle 8 it is provided with a number of perforations, 10, which form a communication between the interior and exterior of said receptacle, whereby the full effect of the cold from the ice 11, which is packed between the lining of case 3 and receptacle 8, may be communicated to the bottle 9.

The figure 12 indicates a cover resting upon ledges 6 and fitting snugly around the mouth of receptacle 8, the purpose of which is to assist in rendering the ice-space between the outer surface of the receptacle 8 and the lining 4 of case 3 air-tight. The cover 12 may be provided with suitable rings or handles, as 13, to render its removal easy. The cover 12, as well as the removable false bottom 7, are preferably composed of zinc.

The top of receptacle 8 is by preference not supplied with a cover, the accessibility of the bottle 9 being thus rendered more convenient. The lid 14 of case 3 is for convenience hinged, as at 15, is provided with means for securing or locking it in a closed condition, and is supplied with a handle, as 16, so that it may be easily lifted and carried. The interior surface of lid 14 is covered with felt, as 17, whereby, when the lid is closed and locked, the case 3 is more effectually maintained in an air-tight condition.

I shall by preference, when using this refrigerator for milk, make use of a bottle provided with an air-tight stopper similar to the design shown in the drawings, as such a stopper is a serviceable adjunct toward preserving the milk in a pure state.

The quantity of ice necessary for use in this refrigerator is small, even when the largest-size cases are employed, and experiment has shown that one filling of ice in a small case will maintain the milk at a cold and even temperature for quite twenty-four hours.

In serving milk to families the purpose is to deliver the milk in the refrigerator, the latter being taken up when making the next delivery. By this plan not only is the milk delivered in a cold condition, but the consumer is furnished with means for keeping it cold and sweet.

Having thus described my invention, what I claim as new, and desire to secure by Letters Patent, is—

1. A refrigerator box or case provided with a lining having ledges, as 5 6, and a lid for closing said case, combined with a false bottom resting upon ledge 5, a removable receptacle passing centrally through said false bottom, and a cover surrounding the mouth of said receptacle and resting upon ledge 6, substantially as set forth.

2. A refrigerator box or case provided with a lining having ledges, as 5 6, and a lid for closing said case, combined with a false bottom resting upon ledge 5, a removable receptacle passing centrally through said false bottom and provided with perforations at its top, and a cover surrounding the mouth of said receptacle above the perforations and resting upon ledge 6, substantially as set forth.

3. A refrigerator box or case provided with a lining having ledges, as 5 6, and a lid for closing the box or case provided upon its under surface with felt, and with a handle, as 16, combined with a false bottom resting upon ledge 5, a receptacle passing centrally through said false bottom and perforated at its top, and a cover surrounding the mouth of said receptacle and resting upon ledge 6, substantially as set forth.

Signed at New York, in the county of New York and State of New York, this 21st day of September, A. D. 1887.

C. BRADLEY TRAVER.

Witnesses:
J. E. M. BOWEN,
GEO. B. LAUCK.